United States Patent
Tanaka

(10) Patent No.: US 7,314,533 B2
(45) Date of Patent: Jan. 1, 2008

(54) MANUFACTURING METHOD OF TIRE REINFORCING MATERIAL AND MANUFACTURING METHOD OF PNEUMATIC TIRE USING THE TIRE REINFORCING MATERIAL

(75) Inventor: Gaku Tanaka, Kobe (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 303 days.

(21) Appl. No.: 11/067,740

(22) Filed: Mar. 1, 2005

(65) Prior Publication Data

US 2005/0269015 A1 Dec. 8, 2005

(30) Foreign Application Priority Data

Jun. 7, 2004 (JP) ............................ 2004-168749
Sep. 17, 2004 (JP) ............................ 2004-271426

(51) Int. Cl.
*B29D 30/38* (2006.01)
(52) U.S. Cl. .................... 156/134; 156/133; 156/247; 156/258; 156/906
(58) Field of Classification Search ................ 156/134, 156/258, 304.5, 406.4, 906, 247, 248, 133; 152/548
See application file for complete search history.

(56) References Cited

U.S. PATENT DOCUMENTS 1,467,289 A * 9/1923 Eames ........................ 156/258
2,754,887 A 7/1956 Wykoff
3,237,673 A 3/1966 Ward
4,600,045 A * 7/1986 Dudziak ...................... 152/526
2004/0011449 A1 * 1/2004 Ikeda .......................... 152/525

FOREIGN PATENT DOCUMENTS

| JP | 58-101805 A | 6/1983 |
| JP | 61-43457 B2 | 9/1986 |
| JP | 4-14462 Y2 | 3/1992 |
| JP | 5-154938 | 6/1993 |
| JP | 2000-6262 | 1/2000 |

OTHER PUBLICATIONS

Machine translation for JP 2000-6262.*

* cited by examiner

*Primary Examiner*—Geoffrey L. Knable
(74) *Attorney, Agent, or Firm*—Birch, Stewart, Kolasch & Birch, LLP

(57) ABSTRACT

A method of manufacturing a tire reinforcing material for achieving uniformity in stiffness at a joint of a ply of a cord fabric and improving dynamic uniformity of a tire shaped and vulcanized, the cord fabric constructed of warp cords arranged in parallel with each other and wefts arranged substantially orthogonally to the warp cords, includes: a topping step for coating with rubber the cord fabric having the wefts folded back at respective warp cords at opposing ends of the cord fabric to produce a ply; a cutting step for cutting the ply into ply pieces each having a predetermined length; a joint forming step for removing one to five cords at each of opposing ends of the ply to form a joint; and a joining step for joining together the joint of one of the ply pieces and the joint of another ply piece.

4 Claims, 4 Drawing Sheets

MANUFACTURING METHOD OF TIRE REINFORCING MATERIAL AND MANUFACTURING METHOD OF PNEUMATIC TIRE USING THE TIRE REINFORCING MATERIAL

This nonprovisional application is based on Japanese Patent Applications Nos. 2004-168749 and 2004-271426 filed with the Japan Patent Office on Jun. 7, 2004 and Sep. 17, 2004, respectively, the entire contents of which are hereby incorporated by reference.

BACKGROUND OF THE INVENTION

1. Field of the Invention

The present invention relates to a method of manufacturing a tire reinforcing material using a cord fabric as well as a method of manufacturing a pneumatic tire using the tire reinforcing material, particularly improving uniformity of joint regions at opposing ply ends of a reinforcing material used for such parts as tire carcass, chafer and bead reinforcing layer, and enhancing dynamic uniformity of the pneumatic tire in running.

2. Description of the Background Art

A cord fabric is generally used for a reinforcing material of a tire. For example, a carcass ply of a radial tire has a cord fabric whose warp cords are arranged in the direction orthogonal to the circumference of the tire. A pneumatic tire of this radial construction is generally manufactured through the following processes.

In a topping process, from the cord fabric constructed of a number of warp cords arranged in parallel with each other and wefts arranged for preventing the warp cords from separating, a rubber-coated ply is produced. The ply is cut along the direction substantially orthogonal to the longitudinal direction of the warp cords into ply pieces each having a predetermined length. The ply pieces are joined together by laying each of the opposing ends along the longitudinal direction of the warp cords of a ply piece on one of the opposing ends of another ply piece so that a salvage including two to ten cords of one ply piece are joined onto a salvage including two to ten cords of another ply piece. The joining is repeated a plurality of times to form a cylindrical carcass ply.

The carcass ply is thereafter combined with such reinforcing materials as bead cores and shaped into a torpid. Further, over the outer circumference of the toroidal carcass, a belt layer, a tread rubber and a sidewall rubber for example are applied and, through a subsequent vulcanization and shaping process, a pneumatic tire is produced.

In the above-described conventional manufacturing process of a tire, the ply pieces of the carcass ply are joined together for example as schematically shown in FIG. 4. Referring to FIG. 4, respective opposing ends 41J, 42J of ply pieces 41, 42 are butt-joined to form a joint J. In this case, while there can be no overlap at the joint of the ply pieces, the warp cords at respective ends 41J, 42J of ply pieces 41, 42 have wavy outlines formed at respective folded-back portions 43a of wefts 43. This is because the warp cords at the opposing ends of the cord fabric are restrained inwardly by the folded-back portions of the wefts. Therefore, at the joint of the ply pieces, the waviness of warp cords 40 still remains, deteriorating uniformity of the ply.

Alternatively, as schematically shown in FIG. 5, ply pieces 51, 52 of a carcass ply may be joined together by laying opposing ends on each other to form a joint 5J. In this case, warp cords 51a of ply piece 51 and warp cords 52a of ply piece 52 that are located at joint 5J overlap each other. In other words, joint 5J of the ply pieces contains a larger number of cords as compared with other portions of the ply, resulting in a smaller tension and a larger thermal shrinkage per cord as well as a larger stiffness of the joint. Accordingly, when the tire is shaped and filled with air to form an internal pressure, the joint expands less than other portions of the ply and consequently depressions of sidewalls are caused at the joint locations, resulting in a non-uniform shape of the sidewalls and considerable deterioration of uniformity in running.

In order to solve the aforementioned problems, Japanese Utility Model Publication No. 4-14462 proposes to reduce the stiffness at the joint by using a special extension cord as a warp cord at a salvage (end) of a cord fabric. Japanese Patent Laying-Open No. 58-101805 discloses that low-shrinkage polyester cords are used at a salvage of a cord fabric. Moreover, Japanese Patent Publication No. 61-43457 discloses a cord fabric having its salvage where high extension warp cords and normal warp cords are alternately arranged.

The aforementioned inventions or the like each make improvements in the warp of the cord fabric. Alternatively, the weft of the cord fabric may be improved by providing the weft extending to be turned at the endmost warp cord at a salvage of the cord fabric and ending at the other salvage of the cord fabric, and the weft is V-shaped for stabilizing the movement of the warp.

SUMMARY OF THE INVENTION

For the above-described techniques, it is difficult to make uniform the stiffness at joints of a ply of a cord fabric. When the tire is shaped and vulcanized and then filled with air to form an internal pressure, the sidewalls have depressions at locations corresponding to joints of a cord fabric due to insufficient inflation, deteriorating dynamic uniformity when the tire is rolling. The present invention accordingly solves such problems.

The present invention is a method of manufacturing a tire reinforcing material formed of a cord fabric constructed of warp cords arranged in parallel with each other and wefts arranged substantially orthogonally to the warp cords. The method includes: a topping step for coating with rubber the cord fabric having the wefts folded back at respective warp cords at opposing ends of the cord fabric to produce a ply; a cutting step for cutting the ply into ply pieces each having a predetermined length; a joint forming step for removing one to five cords at each of opposing ends of the ply to form a joint; and a joining step for joining together the joint of one of the ply pieces and the joint of another ply piece.

In the joint forming step, one to five warp cords at each of the opposing ends of the ply is/are removed and a folded-back portion of the wefts at each of the opposing ends of the ply is cut. Thus, tension concentration in this region is avoided and the waviness at the joint is reduced. Here, preferably the joint is 0.5 to 2 mm in width. According to the present invention, the tire reinforcing material is suitably used for a carcass ply. Further, the present invention is a method of manufacturing a pneumatic tire including the method of manufacturing the carcass ply.

According to the present invention, since the warp cords located at the folded-back portions of the wefts of the cord fabric are restrained inwardly of the fabric, one to five of the warp cords is/are removed from the ply to form joints and the joints are laid on each other for joining together ply pieces, so that the ply of uniform property as that of portions of the ply except for the joints can be produced. Accordingly, when the tire having been shaped and vulcanized is filled with air to an appropriate internal pressure, reduction in occurrence of depressions of the sidewalls and improvements in uniformity can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention is a method of manufacturing a tire reinforcing material formed of a cord fabric constructed of warp cords arranged in parallel with each other and wefts arranged substantially orthogonally to the warp cords. The method includes: a topping step for coating with rubber the cord fabric having the wefts folded back at respective warp cords at opposing ends of the cord fabric to produce a ply; a cutting step for cutting the ply into ply pieces each having a predetermined length; a joint forming step for removing one to five cords at each of opposing ends of the ply to form a joint; and a joining step for joining together the joint of one of the ply pieces and the joint of another ply piece.

An embodiment of the present invention is hereinafter described with reference to the drawings.

Cord Fabric

Figure 1A:
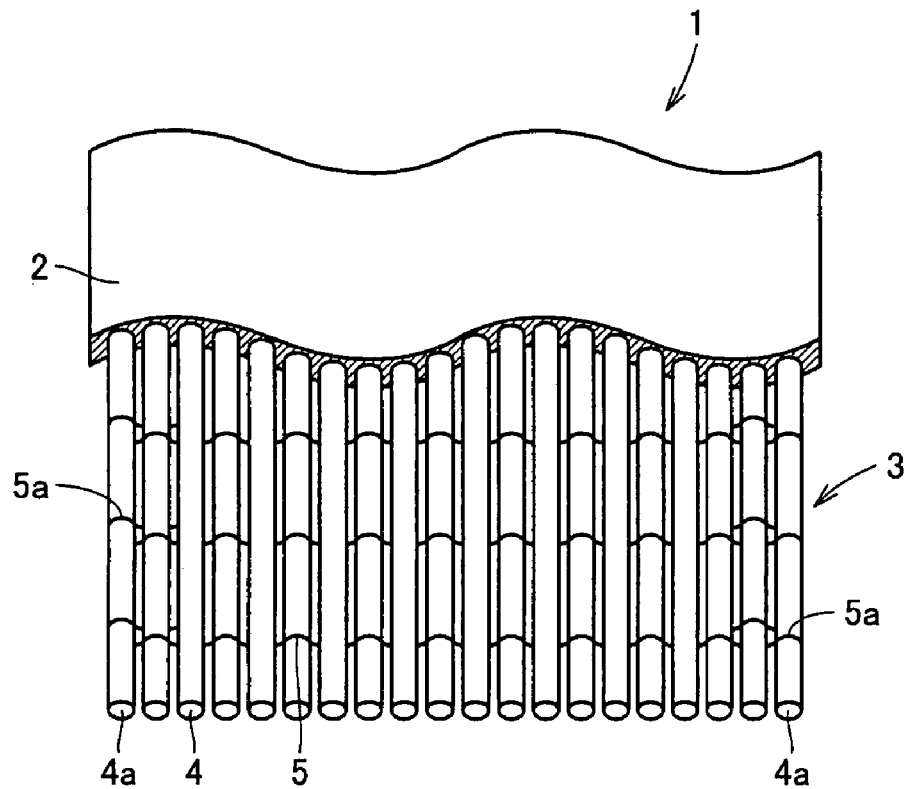
FIGS. 1A and 1B schematically show a ply of a cord fabric.

Referring to FIG. 1A, a cord fabric 3 is constructed of warp cords for reinforcing a tire that are interlaced with wefts, as described above. As the warp cords, generally employed tire cords for example are used. The warp cords are not melted by heat during a vulcanizing and shaping process nor heat during a heating process for the purpose of adhesive application for example, and the warp cords are aligned in a vulcanized pneumatic tire to reinforce the pneumatic tire. Specifically, warp cords 4 are arranged more densely than wefts 5. The density may arbitrarily be set depending on a tire to be used. Moreover, as warp cords 4, tire cords of polyethylene terephthalate, nylon, rayon, vinylon (particularly high-strength vinylon) or aramid may preferably be employed. The warp cords having a fineness in the range from 1260 denier to 6000 denier are preferably used and the wefts having a fineness of 180 denier to 270 denier may preferably be used.

Wefts 5 extend substantially orthogonally to the longitudinal direction of warp cords 4, and wefts 5 as shown in FIG. 1A are interlaced with warp cords 4 so that the wefts alternately pass over and under every adjacent warp cords. Wefts 5 thus serve to keep the constant pitch of many warp cords 4 arranged on a plane. Wefts 5 may be interlaced as shown in FIG. 1A with opposing ends discontinued. Alternatively, wefts 5 may be interlaced to continuously extend and turn at right and left salvages. One of various interweaving methods may thus be employed.

As wefts 5, any yarn of a material that has substantially no melting point and thus is resistant to heat, like cotton and flat rayon, may be used. Alternatively, a low-melting-point material having a melting point of 110 to 150° C. may also be used. In this case, wefts 5 are melted by the actions of heat and tension in a tire vulcanization process, and so-called straw-matting phenomenon, namely a phenomenon of making warp cords 4 wavy, can be prevented. In other words, with heat and pressure under a vulcanization temperature condition of the tire (approximately 140 to 180° C.), the restraining force exerted on the warp cords by the wefts having a melting point in the range of 110 to 150° C. can be weakened in the vulcanization process.

As the above-described material for the wefts having a low melting-point, any of high-density polyethylene, copolymer of vinyl chloride and vinyl acetate, copolymer of ethylene and vinyl acetate, polyamide terpolymer, polyamide quaterpolymer, and polyamide multipolymer, for example, may be used.

Wefts 5 are interlaced for keeping constant intervals between the warp cords and preventing the warp cords from separating from each other. Wefts 5 are folded back at warp cords 4a at respective ends of cord fabric 3. Thus, warp cords 4a at folded-back portions 5a of the wefts are restrained inwardly of the cord fabric and accordingly likely to have a wavy shape.

Topping Process

According to the present invention, a ply refers to a cord fabric undergoing an adhesive application process and embedded in a rubber compound. FIG. 1A schematically shows a ply used for the present invention. Referring to FIG. 1A, a ply 1 has a rubber compound 2 in which a cord fabric 3 is embedded. The cord fabric has warp cords 4 arranged in parallel with the longitudinal direction and wefts 5 spaced at constant intervals in the longitudinal direction and arranged substantially orthogonally to the warp cords. The density of the warp cords in the ply is set to the range from 30 cords/5 cm to 50 cords/5 cm. The density of the wefts in the ply is set to the range from 2 wefts/5 cm to 6 wefts/5 cm.

The cord fabric is subjected to the adhesive application process before embedded in the rubber compound. The adhesive application process includes an immersion process for immersing the cord fabric in an adhesive solution and a subsequent heating process for heating (baking) the cord fabric in the state in which a certain tension is exerted on the warp cords. Adhesiveness of the cord fabric for tire reinforcement to rubber is thus increased. After the adhesive application process, an unvulcanized rubber is applied over the top and bottom of the cord fabric. The so-called ply is thus prepared for use as a tire reinforcing material.

According to the present invention, the adhesive application process includes the immersion process in which the cord fabric for tire reinforcement is immersed in an adhesive solution containing for example a mixture of a primary condensation product of resorcin and formalin and vinylpyridine latex or a mixture of vinylpyridine latex and SBR latex to which various chemicals are added, and the subsequent heating process in which the cord fabric is heated in the state in which a certain tension is exerted on the warp cords.

Cutting Process

In FIG. 1A, ply 1 is schematically shown having cord fabric 3 topped with unvulcanized rubber compound 2. Ply 1 is cut into ply pieces at constant intervals in the direction substantially orthogonal to the longitudinal direction of warp cords 4, namely cut in the direction that is substantially the same as that in which wefts 5 are arranged. When the ply is used for a carcass ply of a radial tire, the width of the cut side of the resultant ply piece corresponds to the arc length in the toroidal cross section of the carcass extending between beads and thus warp cords 4 are arranged at a right angle (in the radial direction) to the circumferential direction of the tire.

Joint Forming Process/Joining Process

Figure 2:
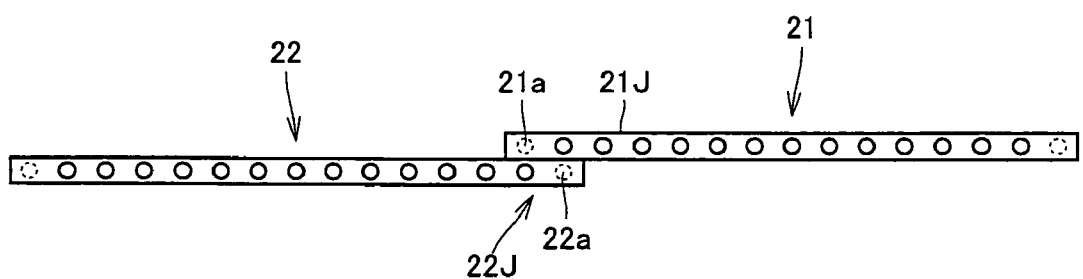
FIGS. 2A and 2B schematically show a joint method of a ply according to the present invention.
Figure 2:
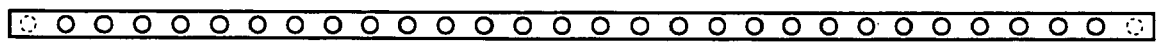
Figure 4:
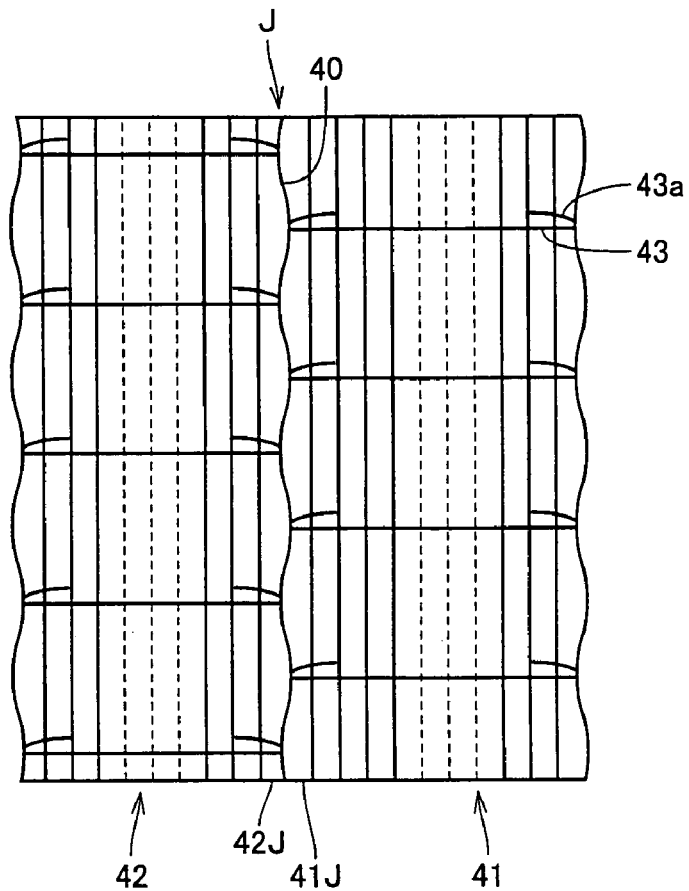
FIG. 4 schematically shows a state of a joint of a conventional ply.
Figure 5:
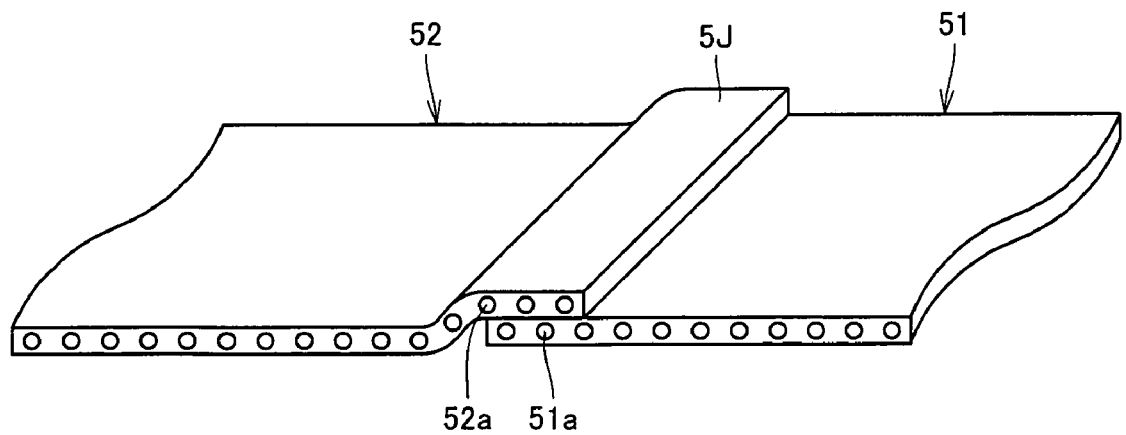
FIG. 5 schematically shows a state of a joint of a conventional ply.

With reference to FIGS. 2A and 2B, a method of joining the ply pieces into which the ply is cut is described. In FIG. 2A, an end 21J of a ply piece 21 is laid on an end 22J of a ply piece 22. Before the ply pieces are joined together, one to five warp cord/cords at each of ends 21J located at opposing ends of ply piece 21 and ends 22J located at opposing ends of ply piece 22 is/are removed. The traces of the removed warp cords at the ends of the ply pieces are indicated by 21a, 22a. Referring again to FIG. 1A, warp cords 4a at respective ends of the cord fabric are restrained inwardly of the cord fabric at the position of folded back portions 5a of wefts 5. Consequently, as shown in FIG. 4, warp cords 40 at the ends of the ply extend wavily in the longitudinal direction.

As detailed below, the waviness at the joint of the ply pieces is eliminated by removing one to five warp cords at each end of the ply pieces. Preferably, the number of the warp cords removed from the ply piece is one to three. When the number of removed warp cords is more than five, useless material cost is necessary for removing the cords while the waviness elimination effect is achieved. Further, the width of the joint between ply pieces is preferably set to 0.5 to 2 mm.

Figure 1B:
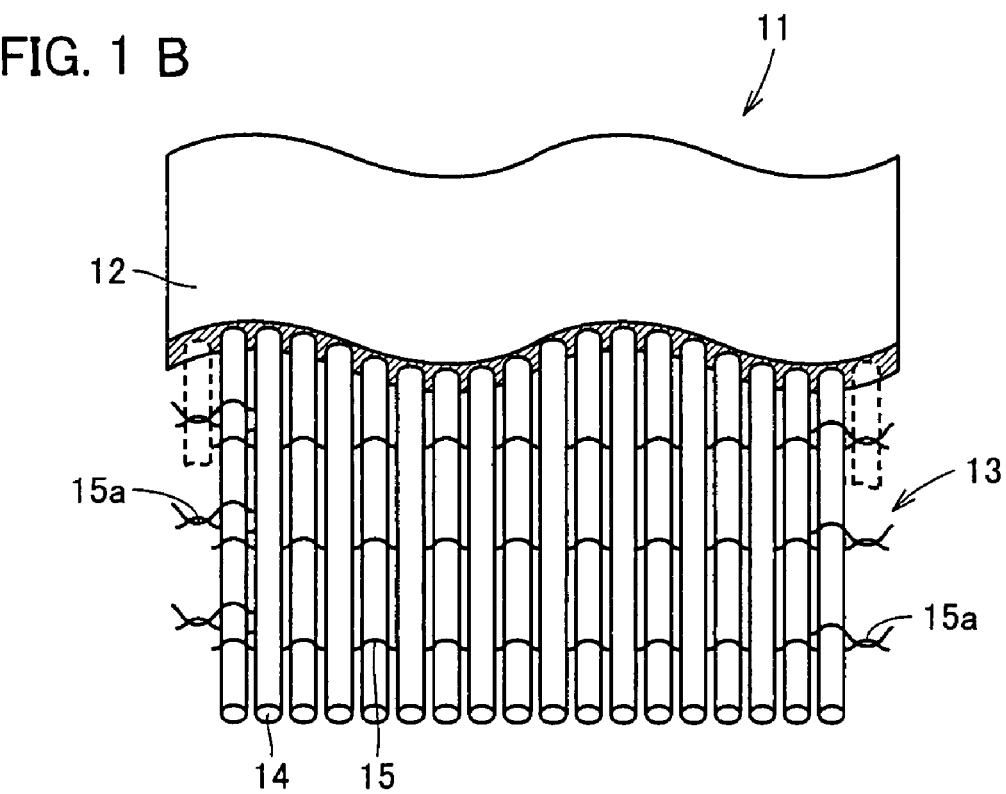

According to the present invention, as schematically shown in FIG. 1B, one to five warp cords (one in FIG. 1B) at each of opposing ends of a ply 11 is/are removed from a rubber 12 and folded-back portions 15a of wefts at opposing ends of the ply are cut, so that stress concentration on the warp cords located at the ends of the ply is avoided to effectively reduce the waviness at the joint. Preferably, according to the present invention, ply pieces are joined by laying ends on each other so that the warp cords at the ends do not overlap and accordingly a single layer in which the warp cords are arranged at constant intervals in cross section is formed as shown in FIG. 2B.

Manufacture of Pneumatic Tire

Figure 3:
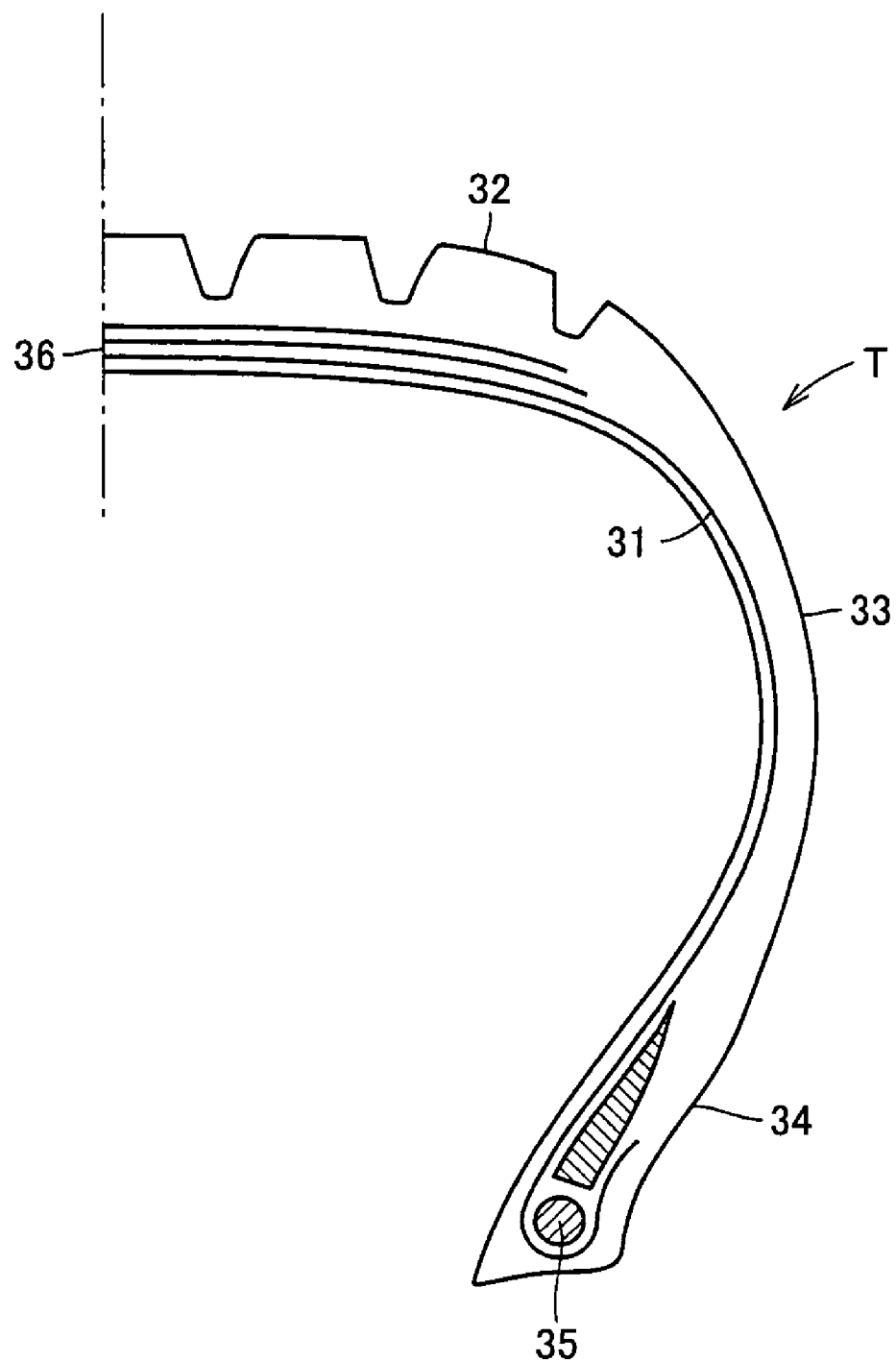
FIG. 3 shows the right half of a cross section of a pneumatic radial tire according to the present invention.

A plurality of ply pieces as discussed above are joined together into a cylindrical ply and this ply can be used for a carcass ply of a pneumatic tire. FIG. 3 shows a cross section of the right half of a pneumatic tire T, having, as a carcass ply 31, one ply extending from a tread 32 through a sidewall 33 to be turned and secured around a bead core 35 of a bead 34. In the crown area of the tire, a belt layer 36 of two plies is provided at an angle of 5° to 45° to the circumferential direction of the tire. The tire shown in FIG. 3 is a pneumatic tire of radial construction and the warp cords of the carcass ply are arranged to extend in the radial direction (orthogonal to the circumferential direction of the tire) in the tire.

Pneumatic tire T is manufactured using this carcass ply through a usual shaping method. Specifically, the carcass ply, bead cores, the belt layer, and a tread rubber for example are assembled into a green tire cover that is vulcanized in a vulcanizing mold to produce the pneumatic tire.

EXAMPLES

Preparation of Cord Fabric/Ply

A cord fabric having polyester cords (1500 denier/two-ply) as warp cords and wefts of 225 denier was used.

The cord fabric underwent an adhesive application process for improving adhesiveness to rubber. In the adhesive application process, the cord fabric was immersed in an adhesive solution containing for example a mixture of a primary condensation product of resorcin and formalin, vinylpyridine latex and SBR latex to which various chemicals are added, and the cord fabric was heated in the state in which a certain tension was exerted on the warp cords. The top and bottom of the cord fabric were thereafter topped with an unvulcanized rubber and thus prepared as a ply to manufacture a tire reinforcing material.

Preparation of Ply Pieces and Ply Joining

The ply was cut at constant intervals in the longitudinal direction. Since the ply was used as a carcass ply of a radial tire, the width of the cut side was made equal to the arc length in a cross section of a toroidal carcass extending between beads.

In Example 1, ply pieces into which the ply was cut were joined in the following way. The ply of the cord fabric shown in FIG. 1B was used. As shown in FIG. 2A, end 21J of ply piece 21 and end 22J of ply piece 22 were arranged to overlap each other. Before joining, one warp cord at each of ends 21J located at opposing ends of ply piece 21 and ends 22J located at opposing ends of ply piece 22 was removed and wefts at folded-back portions 15a were cut. In Comparative Example 1, a conventional ply from which no warp cord was removed was used. Table 1 shows specifications of the examples together with results of evaluation thereof.

According to the present invention, ply pieces are joined by laying ends on each other so that the warp cords at the ends do not overlap and accordingly a single layer in which the warp cords are arranged at constant intervals in cross section is formed as shown in FIG. 2B.

Manufacture of Radial Tire

A plurality of above-described ply pieces were joined into a cylindrical ply and this ply was applied to a carcass ply of a pneumatic radial tire with the size 195/65R15. In the example, the radial tire was manufactured as the pneumatic tire shown in FIG. 3. The specifications of the pneumatic radial tire are as follows.

Belt layer: two belt layers

Steel cord: 1×4×0.25

Angle: 22°×22° (with respect to the tire circumferential direction)

Tire vulcanizing conditions: 165° C.×20 minutes

Evaluation of Tire Performance (1) Tire Uniformity (RFV: Radial Force Variation)

(1-1) RFV OA

RFV refers to vibrations in the up-and-down direction appearing on the axis of the tire when the tire is being rotated while a load is exerted thereon and the axis is kept at a certain level, the vibrations being a source of vibrations when a vehicle is actually running.

The measurements were taken with a tire running machine under the conditions of a running speed of 60 rpm, a load of 4000 N and a rim width of 15×6 inches. The unit of the measurements is N.

(1-2) RFV 1H "RFV 1H" represents the value of the primary component obtained by analyzing the measurement of RFV (OA) into components of order.

(1-3) RFV 2H

"RFV 2H" represents the value of the secondary component obtained by analyzing the measurement of RFV (OA) into components of order.

(2) Bulge/Dent Evaluation

A bulge/dent evaluation was made by visual inspection of unevenness of the outer surface of sidewalls of a tire. The result of the evaluation is indicated by score 1 to 5. A higher score represents a smaller degree of unevenness of the outer surface of the sidewalls. From Table 1, it is seen that the uniformity (RFV) as well as bulge/dent property of Example 1 are improved.

TABLE 1

| | | Example 1 | Comparative Example 1 |
|---|---|---|---|
| cord fabric | warp material | polyester | polyester |
| | denier | 1500 | 1500 |
| | weft material | cotton and polyester | cotton and polyester |
| | denier | 225 | 225 |
| ply | density of warp cords (number of cords/5 cm) | 50 | 50 |
| | joint width(mm) | 1.5 | 1.5 |
| | number of removed warp cords | one at each end | — |
| | uniformity | | |
| tire properties | (1) RFV•OA (N) | 48.5 | 68.1 |
| | (2) RFV•1H (N) | 41.3 | 56.8 |
| | (3) RFV•2H (N) | 10.2 | 21.8 |
| | bulge/dent | 3.8 | 3.2 |

A pneumatic tire using a carcass ply manufactured by the method of manufacturing a tire reinforcing material of the present invention has no waviness nor overlap at the joint of the ply. The tire thus has uniformity as a whole. In particular, with no dent or depression on the surface of the sidewalls, the tire is aesthetically pleasant and thus has a higher commercial value. Moreover, the tire is also improved in uniformity (radial force variation) in running.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a tire reinforcing material formed of a cord fabric constructed of warp cords arranged in parallel with each other and wefts arranged substantially orthogonally to said warp cords, comprising:
    a topping step for coating with rubber said cord fabric having said wefts folded back at respective warp cords at opposing ends of said cord fabric to produce a ply;
    a cutting step for cutting said ply into ply pieces each having a predetermined length;
    a joint forming step for removing one to five cords at each of opposing ends of said ply to form a joint; wherein
        one to five warp cords at each of the opposing ends of said ply is/are removed: and
        a folded-back portion of said wefts at each of the opposing ends of said ply is cut; and
    a joining step for joining together the joint of one of said ply pieces and the joint of another ply piece.

2. The method of manufacturing a tire reinforcing material according to claim 1, wherein said joint is 0.5 to 2 mm in width.

3. The method of manufacturing a tire reinforcing material according to claim 1, wherein said tire reinforcing material is a carcass ply.

4. A method of manufacturing a pneumatic tire including the method of manufacturing the carcass ply as recited in claim 3.

* * * * *